US011959197B2

(12) United States Patent
Matsuyama et al.

(10) Patent No.: US 11,959,197 B2
(45) Date of Patent: Apr. 16, 2024

(54) CARBON FIBER PRECURSOR ACRYLIC FIBER, CARBON FIBER, AND METHOD FOR PRODUCING SAME

(71) Applicant: Mitsubishi Chemical Corporation, Chiyoda-ku (JP)

(72) Inventors: Naomasa Matsuyama, Chiyoda-ku (JP); Yuutarou Nakamura, Chiyoda-ku (JP); Norifumi Hirota, Chiyoda-ku (JP); Hiroko Matsumura, Chiyoda-ku (JP); Katsuhiko Ikeda, Chiyoda-ku (JP); Kouki Wakabayashi, Chiyoda-ku (JP); Tadashi Ootani, Chiyoda-ku (JP); Akihiro Itou, Chiyoda-ku (JP); Kenji Hirano, Chiyoda-ku (JP); Akito Hatayama, Chiyoda-ku (JP); Kenji Kaneta, Chiyoda-ku (JP); Atsushi Nakajima, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 840 days.

(21) Appl. No.: 16/541,352

(22) Filed: Aug. 15, 2019

(65) Prior Publication Data
US 2020/0002850 A1 Jan. 2, 2020

Related U.S. Application Data

(63) Continuation of application No. PCT/JP2018/005500, filed on Feb. 16, 2018.

(30) Foreign Application Priority Data

Feb. 16, 2017 (JP) ................................. 2017-026727

(51) Int. Cl.
*D01F 9/22* (2006.01)
*D01D 5/00* (2006.01)
*D01F 6/18* (2006.01)

(52) U.S. Cl.
CPC ............. *D01F 9/22* (2013.01); *D01D 5/0046* (2013.01); *D01F 6/18* (2013.01); *D10B 2101/12* (2013.01); *D10B 2401/061* (2013.01)

(58) Field of Classification Search
CPC ......... D01F 9/22; D01F 9/12–328; D01F 6/18
See application file for complete search history.

(56) References Cited

U.S. PATENT DOCUMENTS

2002/0041957 A1* 4/2002 Ikeda ........................ D01F 9/22
264/172.14
2003/0064221 A1 4/2003 Ikeda et al.
(Continued)

FOREIGN PATENT DOCUMENTS

CN 1829839 A 9/2006
CN 101694016 A 4/2010
(Continued)

OTHER PUBLICATIONS

"JP2016160560_Machine Translation" is a machine translation of JP-2016160560-A. (Year: 2016).*
(Continued)

*Primary Examiner* — Larissa Rowe Emrich
(74) *Attorney, Agent, or Firm* — Oblon, McClelland, Maier & Neustadt, L.L.P.

(57) ABSTRACT

A first aspect of the present invention is carbon fiber wherein the surface of a monofilament has a center line average roughness Ra of 6.0 nm or more and 13 nm or less, and the monofilament has a long diameter/short diameter ratio of 1.11 or more and 1.245 or less. A second aspect of the present invention is carbon fiber precursor acrylic fiber (Continued)

wherein the surface of a monofilament has a center line average roughness Ra of 18 nm or more and 27 nm or less, and the monofilament has a long diameter/short diameter ratio of 1.11 or more and 1.245 or less. The carbon fiber according to the first aspect is obtained by stabilizing and carbonizing under specific conditions the carbon fiber precursor acrylic fiber according to the second aspect.

14 Claims, 4 Drawing Sheets

(56) References Cited

U.S. PATENT DOCUMENTS

| | | | | |
|---|---|---|---|---|
| 2013/0274413 | A1* | 10/2013 | Ozeki | B32B 27/38 427/175 |
| 2015/0184333 | A1 | 7/2015 | Arai et al. | |
| 2015/0274860 | A1* | 10/2015 | Sako | D01F 9/225 423/447.2 |
| 2020/0002850 | A1 | 1/2020 | Matsuyama et al. | |

FOREIGN PATENT DOCUMENTS

| | | | |
|---|---|---|---|
| CN | 102884247 | A | 1/2013 |
| CN | 104662214 | A | 5/2015 |
| JP | 2002242027 | A * | 8/2002 |
| JP | 2010-285710 | A | 12/2010 |
| JP | 2012-154000 | A | 8/2012 |
| JP | 2016-030869 | A | 3/2016 |
| JP | 2016-160560 | A | 9/2016 |
| JP | 2016160560 | A * | 9/2016 |
| WO | WO 01/98566 | A1 | 12/2001 |
| WO | WO 2014/017339 | A1 | 1/2014 |
| WO | WO 2018/151255 | A1 | 8/2018 |

OTHER PUBLICATIONS

"JP2002242027_Machine Translation" is a machine translation of JP-2002242027-A. (Year: 2002).*
International Search report dated May 1, 2018 in PCT/JP2018/005500 filed Feb. 16, 2018.
Written Opinion dated May 1, 2018 in PCT/JP2018/005500 filed Feb. 16, 2018.
Chinese Office Action dated Dec. 30, 2021 in Chinese Patent Application No. 201880012166.1 (with English translation), 11 pages.
Office Action dated Jan. 11, 2022 in corresponding Japanese Patent Application No. 2020-218693 (with English Translation), 12 pages.
Combined Chinese Office Action and Search Report dated May 24, 2021 in Chinese Patent Application No. 201880012166.1 (with English translation), 12 pages.

* cited by examiner

[Fig.1]
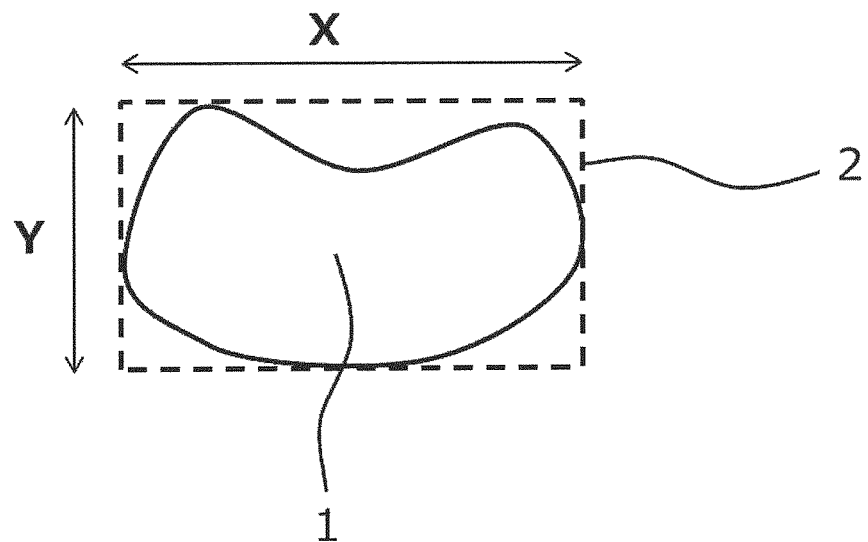
[Fig.2]
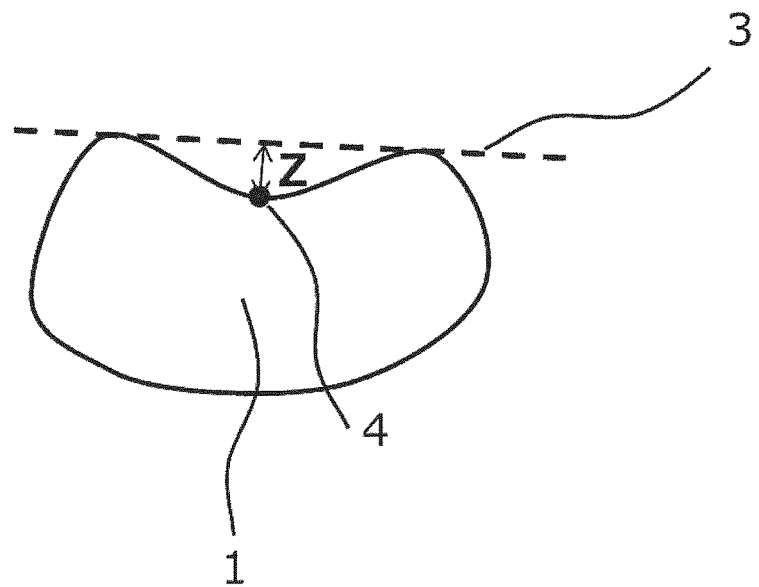

[Fig.3]
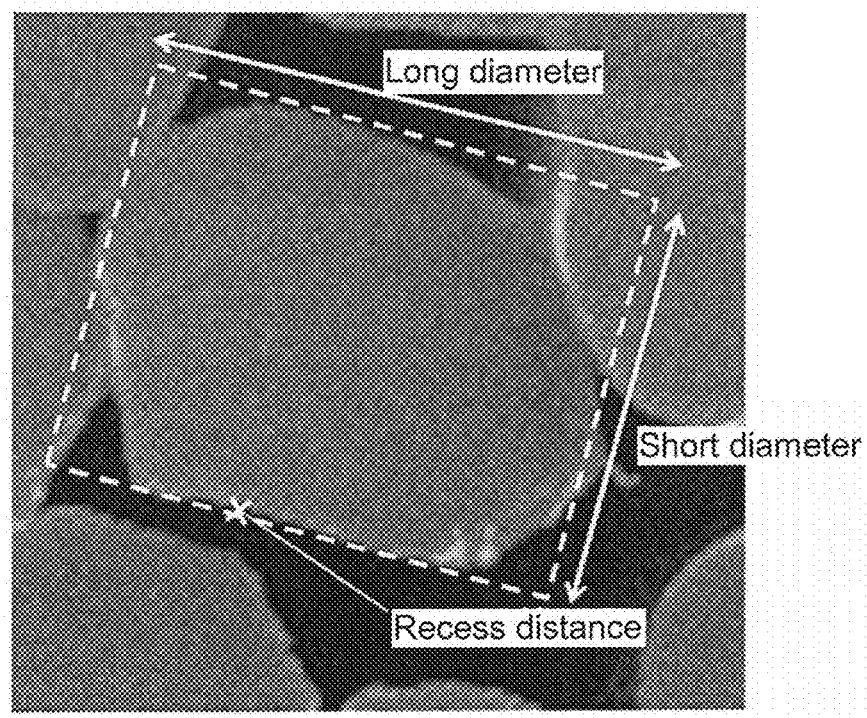
Long diameter/short diameter ration of monofilament:1.24
Recess distance/short diameter ratio of monofilament:0.016

[Fig.4]
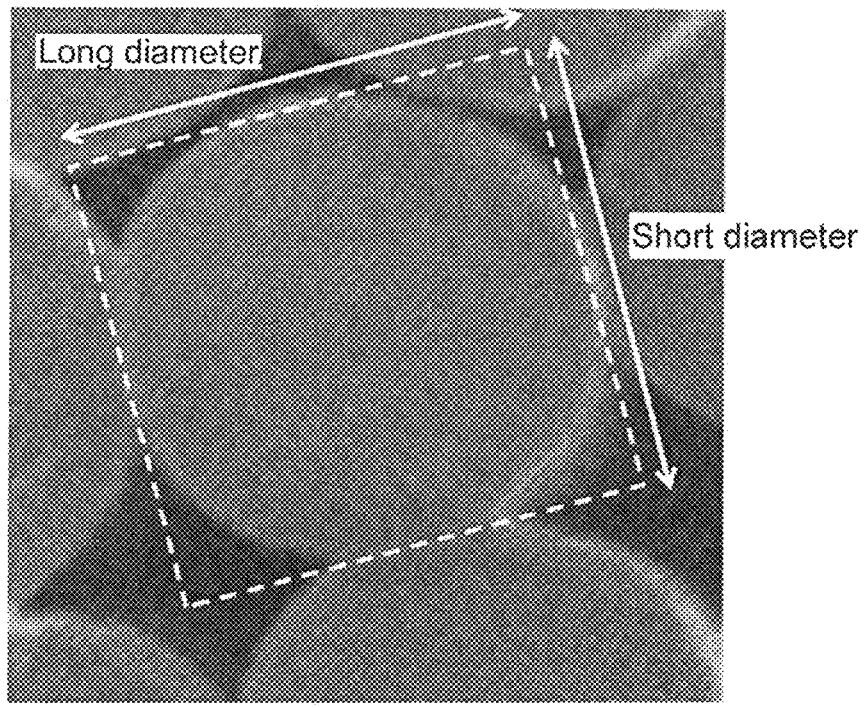
Long diameter/short diameter ration of monofilament: 1.05
Recess distance/short diameter ratio of monofilament: 0.000

[Fig.5]
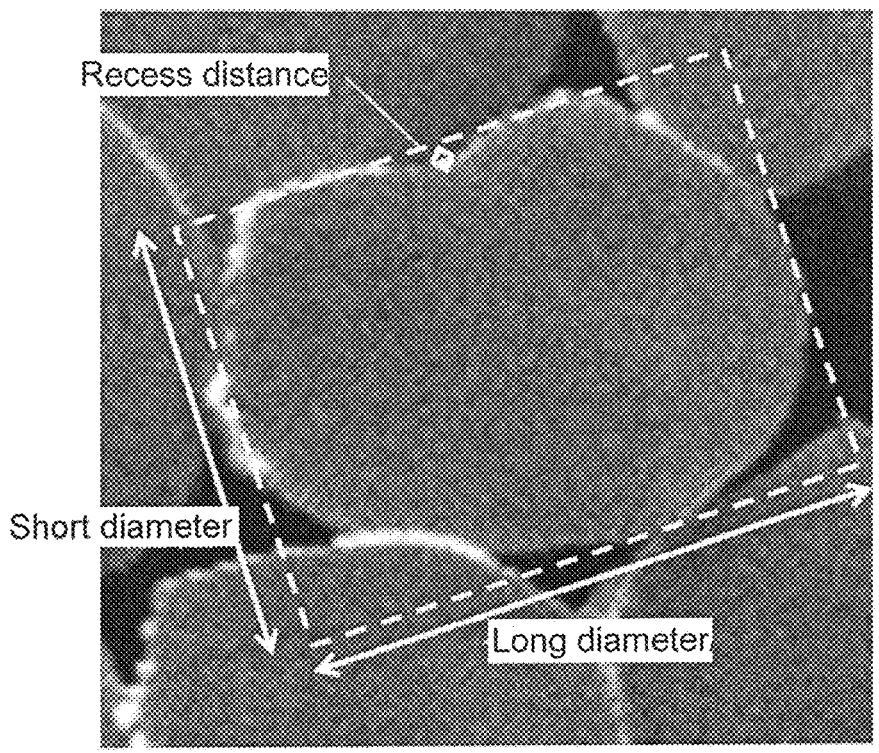
Long diameter/short diameter ration of monofilament:1.35
Recess distance/short diameter ratio of monofilament:0.075

CARBON FIBER PRECURSOR ACRYLIC FIBER, CARBON FIBER, AND METHOD FOR PRODUCING SAME

TECHNICAL FIELD

The present invention relates to a carbon fiber precursor acrylic fiber, a carbon fiber, and methods for producing the carbon fiber precursor acrylic fiber and the carbon fiber.

BACKGROUND ART

In recent years, the range of applications of pressure vessels to be used for various purposes in various kinds of industries has been more and more expanded, and development as pressure vessels installed in automobiles fueled by natural gas (CNG tanks) and pressure vessels installed in fuel cell vehicles fueled by hydrogen gas (CHG tanks) has been promoted. In the market, it is desired to make automobile pressure vessels lighter for improvement in fuel efficiency.

A carbon fiber pressure vessel is prepared usually in the following manner: a bundle composed of carbon fiber monofilaments (hereinafter, sometimes referred to as a carbon fiber bundle) is impregnated with resin such as epoxy resin, and wound around a metal or resin cylindrical article called a liner, and the resin is heated and cured (hereinafter, sometimes referred to as a filament winding method).

Carbon fiber is known to have a high specific strength and specific elastic modulus in general, and a carbon fiber pressure vessel (hereinafter, sometimes referred to as a CFRP tank) is comparable in strength to a metallic pressure vessel, and lightweight.

However, in the field of automobile pressure vessels, particularly CHG tanks, further enhancement in strength is desired.

For enhancement in the strength of a CFRP tank, it is important to enhance the strand strength of carbon fiber used, to suppress generation of voids in a carbon fiber reinforced plastic (hereinafter, sometimes referred to as CFRP) forming the CFRP tank, and to reduce unevenness in the fiber volume content in CFRP.

In carbon fiber produced in a conventional technique, there is a tendency that as the depth of wrinkles formed on the surfaces of monofilaments forming a carbon fiber bundle decreases, the bundling property of the carbon fiber bundle becomes higher, so that impregnation of resin into the carbon fiber bundle is insufficient, leading to generation of voids in CFRP. Conversely, there is a tendency that as wrinkles formed on the surfaces of monofilaments are excessively deep, the bundling property of the carbon fiber bundle becomes insufficient, so that impregnation of resin is non-constant, leading to an increase in unevenness in the fiber volume content in CFRP.

Further, there is a tendency that as the circularity of the cross-sectional shape of each of monofilaments forming the carbon fiber bundle becomes higher, the sizes of gaps between the monofilaments decrease, so that impregnation of resin into the carbon fiber bundle is insufficient, leading to generation of voids in CFRP. Conversely, there is a tendency that as the circularity of the cross-sectional shape of each of monofilaments facing to the fiber axis direction becomes lower, variations in size of gaps between the monofilaments increase, so that impregnation of resin into the carbon fiber bundle is non-constant, leading to an increase in unevenness in the fiber volume content in CFRP.

Therefore, for enhancement in the strength of a CFRP tank, carbon fiber having high strand strength and in which the cross-sectional shape of each of monofilaments and wrinkles formed on the surfaces of the monofilaments are adequately controlled is desirable.

Patent Literature 1 suggests that by controlling the uneven surface structure of the surfaces of monofilaments forming a carbon fiber bundle, reduction of fracture toughness due to stress concentration is suppressed while interfacial adhesion with resin is maintained, and by enhancing the circularity of the cross-sectional shape of each of monofilaments forming the carbon fiber bundle, reduction of fracture toughness due to stress concentration is suppressed to obtain a carbon fiber reinforced composite material having high mechanical properties. However, since the cross-sectional shape of each of monofilaments forming the carbon fiber bundle has high circularity, and the depth of the uneven structure on the surfaces of the monofilaments is small, the resulting CFRP tank may have a large number of voids. When there are a lot of voids, it is difficult to obtain high strength.

Further, Patent Literature 2 suggests that by making a carbon fiber bundle have a flat shape having uniform width, so that variations in width of the fiber bundle after impregnation of resin is suppressed, a carbon fiber bundle suitable for production of CFRP tanks by a filament winding method is obtained. For this purpose, the cross-sectional shape and the arithmetic average roughness of the surface of each of monofilaments forming the carbon fiber bundle are controlled. However, since the cross-sectional shape of each of monofilaments forming the carbon fiber bundle used has high circularity, the monofilaments are easily close-packed, and the resulting CFRP tanks tend to have a lot of voids, so that it is difficult to obtain high strength.

CITATION LIST

Patent Literature

Patent Literature 1: JP2010-285710A
Patent Literature 2: JP2012-154000A

SUMMARY OF INVENTION

Technical Problem

The present invention has been made for solving the above-mentioned problems, and provides carbon fiber and a carbon fiber bundle in which the cross-sectional shape of each of monofilaments forming the carbon fiber bundle and wrinkles formed on the surfaces of the monofilaments are adequately controlled, so that in the process of producing a CFRP tank by a filament winding method, formation of bubbles can be suppressed to reduce unevenness in the resin content at the time of impregnating the carbon fiber bundle with thermosetting resin, and thus voids in CFRP of the CFRP tank can be suppressed, and thus unevenness in the fiber volume content of CFRP can be reduced, resulting in enhancement in the strength of the CFRP tank; carbon fiber precursor acrylic fiber and a carbon fiber precursor acrylic fiber bundle which are used as raw materials for the carbon fiber and the carbon fiber bundle; and methods for producing the carbon fiber precursor acrylic fiber bundle and the carbon fiber bundle.

Solution to Problem

The above-described object is achieved by the following methods.

That is, a first aspect of the present invention is a carbon fiber wherein the surface of a monofilament has a center line average roughness Ra of 6.0 nm or more and 13 nm or less, and the monofilament has a long diameter/short diameter ratio of 1.11 or more and 1.245 or less.

Preferably, the carbon fiber according to the first aspect of the present invention has any one or more of the following configurations [1] to [3].

[1]

The monofilament has a recess distance/short diameter ratio of 0.011 or more and 0.018 or less.

[2]

The surface of the monofilament has a center line average roughness Ra of 10 nm or less, and the monofilament has a long diameter/short diameter ratio of 1.135 or more.

[3]

The monofilament has a recess distance/short diameter ratio of 0.0145 or more.

A second aspect of the present invention is a carbon fiber precursor acrylic fiber wherein the surface of a monofilament has a center line average roughness Ra of 18 nm or more and 27 nm or less, and the monofilament has a long diameter/short diameter ratio of 1.11 or more and 1.245 or less.

Preferably, the carbon fiber precursor acrylic fiber according to the second aspect of the present invention has any one or more of the following configurations [4] to [6].

[4]

The monofilament has a recess distance/short diameter ratio of 0.011 or more and 0.018 or less.

[5]

The surface of the monofilament has a center line average roughness Ra of 24 nm or less, and the monofilament has a long diameter/short diameter ratio of 1.135 or more.

[6]

The monofilament has a recess distance/short diameter ratio of 0.0145 or more.

A third aspect of the present invention is a method for producing a carbon fiber precursor acrylic fiber bundle, wherein the method includes the following steps 1) to 3):
1) preparing a coagulated yarn by discharging an acrylonitrile-based polymer solution into a coagulation liquid having a coagulation liquid concentration of 65% by mass or more and 70% by mass or less and a coagulation liquid temperature of 36° C. or higher and 40° C. or lower, through a spinneret to coagulate the acrylonitrile-based polymer solution, and simultaneously taking up the coagulated yarn while controlling a tensile force applied to the coagulated yarn to be 55 mgf per filament or more and 75 mgf per filament or less;
2) drawing the coagulated yarn taken up in the step 1) at a ratio of 1.00 or more and 1.15 or less in the air, then washing the coagulated yarn in a washing/drawing bath with water at 50° C. or higher simultaneously drawing the coagulated yarn at a ratio of 2.4 or more and 2.7 or less, wherein the washing/drawing bath has 4 or more and 7 or less stages, and further relaxing or drawing the coagulated yarn at a ratio of 0.97 or more and 1.1 or less in a hot water bath with water at 95° C. or higher to obtain a drawn yarn; and
3) providing the drawn yarn obtained in the step 2) with an oil agent, drying, and then drawing the yarn at a ratio of 3.0 or more and 4.5 or less in a pressurized steam atmosphere at 130° C. or higher and 160° C. or lower; and, wherein the method meets the following requirements 4) and 5):
4) the total draw ratio of the coagulated yarn until the drawn yarn is obtained in the step 2) after the coagulated yarn is taken up in the step 1) is 2.4 or more and 2.7 or less; and
5) the total draw ratio until the drawing in the pressurized steam atmosphere in the step 3) is completed after the coagulated yarn is taken up in the step 1) is 9.0 or more and 12 or less.

A fourth aspect of the present invention is a method for producing a carbon fiber bundle, wherein the method includes the following steps 4) to 6):
4) a stabilization step of heating a carbon fiber precursor acrylic fiber bundle composed of the carbon fiber precursor acrylic fiber according to the second aspect of the present invention in an oxidizing atmosphere at 200° C. or higher and 300° C. or lower to obtain a stabilized fiber bundle;
5) a pre-carbonization step of heating the stabilized fiber bundle at 550° C. or higher and 800° C. or lower in a non-oxidizing atmosphere to obtain a pre-carbonized fiber bundle; and
6) a high-temperature carbonization step of heating the pre-carbonized fiber bundle at 1200° C. or higher and 3000° C. or lower to obtain a carbon fiber bundle.

Advantageous Effect of Invention

According to the present invention, the cross-sectional shape of each of monofilaments of carbon fiber and wrinkles formed on the surfaces of the monofilaments are adequately controlled, so that in the process of producing a CFRP tank by a filament winding method, formation of bubbles can be suppressed to reduce unevenness in the fiber content at the time of impregnating a carbon fiber bundle with thermosetting resin. As a result, a carbon fiber precursor acrylic fiber to be used as a raw material for a carbon fiber enabling enhancement in the strength of the CFRP tank, and the carbon fiber are provided.

BRIEF DESCRIPTION OF DRAWINGS

FIG. 1 is a schematic diagram for illustrating the definition of a long diameter and a short diameter of a monofilament.

FIG. 2 is a schematic diagram for illustrating the definition of a recess distance of a monofilament.

FIG. 3 is an electron-microscopic photographed image of a cross-section of a monofilament forming a carbon fiber precursor acrylic fiber bundle of Example 2.

FIG. 4 is an electron-microscopic photographed image of a cross-section of a monofilament forming a carbon fiber precursor acrylic fiber bundle of Comparative Example 9.

FIG. 5 is an electron-microscopic photographed image of a carbon fiber precursor acrylic fiber cross-section of Example 7.

DESCRIPTION OF EMBODIMENT

In the carbon fiber precursor acrylic fiber of the present invention, a center line average roughness Ra of the surface of a monofilament is 18 nm or more and 27 nm or less. In the present invention, by setting the center line average roughness Ra of the surface of a monofilament of carbon fiber precursor acrylic fiber to 18 nm or more, excessive bundling of a carbon fiber bundle composed of monofilaments of carbon fiber obtained from the carbon fiber precursor acrylic fiber can be suppressed, so that the carbon fiber bundle is easily impregnated with resin. Further, by setting the center line average roughness Ra of the surface of a monofilament of carbon fiber precursor acrylic fiber to 27 nm or less, insufficiency of bundling of a carbon fiber bundle composed of monofilaments of carbon fiber obtained from the carbon fiber precursor acrylic fiber can be prevented, so that the carbon fiber bundle is easily uniformly impregnated with resin.

From the viewpoint of enhancing the strength of a CFRP tank, the center line average roughness Ra of the surface of a monofilament of the carbon fiber precursor acrylic fiber is more preferably 24 nm or less. The center line average roughness Ra of the surface of a monofilament of the carbon fiber precursor acrylic fiber can be measured by a method as described in Examples.

In the carbon fiber precursor acrylic fiber of the present invention, a long diameter/short diameter ratio of a monofilament is 1.11 or more and 1.245 or less. In the present invention, by setting the long diameter/short diameter ratio of a monofilament of carbon fiber precursor acrylic fiber to 1.11 or more, sufficient gaps can be secured between monofilaments forming a carbon fiber bundle obtained by stabilizing and carbonizing a bundle of monofilaments of carbon fiber precursor acrylic fiber (hereinafter, sometimes referred to as carbon fiber precursor acrylic fiber bundle), so that the carbon fiber bundle is easily impregnated with resin. Further, by setting the long diameter/short diameter ratio of a monofilament of carbon fiber precursor acrylic fiber to 1.245 or less, excessive generation of gaps between monofilaments of carbon fiber obtained by stabilizing and carbonizing a bundle of monofilaments of carbon fiber precursor acrylic fiber can be prevented, so that the carbon fiber bundle is easily uniformly impregnated with resin.

From the viewpoint of enhancing the strength of a CFRP tank, the long diameter/short diameter ratio of a monofilament of the carbon fiber precursor acrylic fiber is more preferably 1.135 or more.

The long diameter/short diameter ratio of a monofilament of carbon fiber precursor acrylic fiber is an average of ratios of the length X of the long side and the length Y of the short side (X/Y) in rectangle 2 having the smallest area among rectangles circumscribing cross-section 1 perpendicular to the fiber axis direction of individual monofilaments forming the carbon fiber precursor acrylic fiber. Specifically, the long diameter/short diameter ratio can be measured by the method as described in Examples (see FIG. 1).

In the carbon fiber precursor acrylic fiber of the present invention, a recess distance/short diameter ratio of a monofilament is preferably 0.011 or more and 0.018 or less.

In the present invention, by setting the recess distance/short diameter ratio of a monofilament of carbon fiber precursor acrylic fiber to 0.011 or more, sufficient gaps can be secured between monofilaments of carbon fiber obtained from the carbon fiber precursor acrylic fiber, so that the carbon fiber bundle is easily impregnated with resin. Further, by setting the recess distance/short diameter ratio of a monofilament of the carbon fiber precursor acrylic fiber to 0.018 or less, excessive generation of gaps between monofilaments of carbon fiber obtained from the carbon fiber precursor acrylic fiber is prevented, so that the carbon fiber bundle is easily uniformly impregnated with resin.

From the viewpoint of enhancing the strength of a CFRP tank, the recess distance/short diameter ratio of a monofilament of the carbon fiber precursor acrylic fiber is more preferably 0.0145 or more.

The recess/short diameter ratio of a monofilament of the carbon fiber precursor acrylic fiber is an average of inverse ratios of the length Y of the short side in a rectangle having the smallest area among rectangles circumscribing cross-section 1 perpendicular to the fiber axis direction of individual monofilaments forming the carbon fiber precursor acrylic fiber (see FIG. 1) and a recess distance Z as defined below for the same cross-section 1 (Z/Y). Specifically, the recess distance/short diameter ratio can be measured as described in Examples.

The recess distance is the depth of a recess with the largest area of a space (recess) surrounded by a fiber's cross-section 1 perpendicular to the fiber axis direction of individual monofilaments forming the carbon fiber precursor acrylic fiber and straight line 3 contacting cross-section 1 at two points, and is defined as a distance Z between straight line 3 and point 4 which is the farthest point from straight line 3 among all of the points on a part of the circumference of cross-section 1 which surrounds the recess (see FIG. 2).

The carbon fiber precursor acrylic fiber of the present invention is obtained by spinning an acrylonitrile-based polymer solution in which an acrylonitrile-based polymer is dissolved in a solvent.

The acrylonitrile-based polymer for use in the present invention is a polymer obtained by polymerizing monomers mainly including acrylonitrile. The acrylonitrile-based polymer may be a homopolymer obtained from acrylonitrile alone, or a copolymer obtained by copolymerizing acrylonitrile which is a main component and other monomers.

The content of acrylonitrile units in the acrylonitrile-based polymer can be determined in view of, including, desired quality of the resulting carbon fiber bundle, and is preferably, for example, 90% by mass or more and 99.5% by mass or less, more preferably 96% by mass or more and 99.5% by mass or less. When the content of acrylonitrile units is 90% by mass or more, fusion of monofilaments does not occur in stabilization and carbonization steps for converting carbon fiber precursor acrylic fiber into carbon fiber, and thus reduction in the strand strength of the carbon fiber bundle can be prevented. Further, in treatment such as drawing with a heating roller or pressurized steam, bonding of monofilaments can be avoided. When the content of acrylonitrile units is 99.5% by mass or less, solubility into a solvent is not reduced, and thus precipitation and coagulation of the acrylonitrile-based polymer can be prevented, so that carbon fiber precursor acrylic fiber can be stably produced.

Monomer units other than acrylonitrile in the acrylonitrile-based polymer can be appropriately selected from vinyl-based monomers which can be copolymerized with acrylonitrile, and vinyl-based monomers which improve the hydrophilicity of the acrylonitrile-based polymer, and vinyl-based monomers which accelerate stabilization reactions are preferable.

The method for synthesizing an acrylonitrile-based polymer may be any polymerization method, and the present invention is not restricted by a difference in polymerization method.

Examples of the solvent for the acrylonitrile-based polymer solution include organic solvents such as dimethylacetamide, dimethyl sulfoxide and dimethylformamide, and aqueous solutions of inorganic compounds such as zinc chloride and sodium thiocyanate. Among them, dimethylacetamide, dimethyl sulfoxide and dimethylformamide are preferable because they have high dissolving power for acrylonitrile-based polymers.

The polymer concentration of the acrylonitrile-based polymer solution is preferably 20% by mass or more and 25% by mass or less, more preferably 21% by mass or more and 24% by mass or less. When the polymer concentration is 20% by mass or more, voids in a coagulated yarn will decrease, and therefore the strand strength of the carbon fiber bundle can be enhanced. Further, when the polymer concentration is 25% by mass or less, the acrylonitrile-based polymer solution can retain a moderate viscosity and fluidity, and therefore carbon fiber precursor acrylic fiber is easily produced.

Examples of the spinning method for obtaining carbon fiber precursor acrylic fiber include a wet spinning method in which at the time of discharging an acrylonitrile-based polymer solution through a spinneret (hereinafter, referred to as a nozzle), the solution is directly extruded into a coagulation liquid to be coagulated; a dry spinning method in which the solution is extruded into the air and coagulated in the air; and a wet and dry spinning method in which the solution is extruded into the air once, and then coagulated in a coagulation liquid.

In the present invention, it is preferable to prepare a coagulated yarn by discharging an acrylonitrile-based polymer solution into a coagulation liquid through a nozzle, which has 3000 or more, preferably 12000 or more, more preferably 24000 or more discharge holes, to coagulate the solution, wherein the coagulation liquid is preferably an organic solvent's aqueous solution having an organic solvent concentration of 65% by mass or more and 70% by mass or less and a temperature of 33° C. or higher and 40° C. or lower. The number of discharge holes of one nozzle is preferably 120000 or less, more preferably 60000 or less.

When the concentration of an organic solvent in the organic solvent's aqueous solution which is a coagulation liquid (also referred to as a coagulation liquid concentration) is 65% by mass or more, it is possible to prevent an excessive increase in the long diameter/short diameter ratio of a monofilament of the carbon fiber precursor acrylic fiber and the center line average roughness Ra of the surface of a monofilament. Further, when the concentration of the organic solvent's aqueous solution in the coagulation liquid is 70% by mass or less, it is possible to prevent an excessive decrease in the long diameter/short diameter ratio of a monofilament of the resulting carbon fiber precursor acrylic fiber and the center line average roughness Ra of the surface of a monofilament. The concentration of an organic solvent in the organic solvent's aqueous solution which is a coagulation liquid is more preferably 66% by mass or more and 68% by mass or less for controlling the long diameter/short diameter ratio of a monofilament of the carbon fiber precursor acrylic fiber and the center line average roughness Ra of the surface of a monofilament of the carbon fiber precursor acrylic fiber.

When the temperature of the organic solvent's aqueous solution which is a coagulation liquid is 33° C. or higher, it is possible to prevent an excessive increase in the long diameter/short diameter ratio of a monofilament of the resulting carbon fiber precursor acrylic fiber and the center line average roughness Ra of the surface of a monofilament. Further, when the temperature of the organic solvent's aqueous solution which is a coagulation liquid is 40° C. or lower, it is possible to prevent an excessive decrease in the long diameter/short diameter ratio of a monofilament of the resulting carbon fiber precursor acrylic fiber and the center line average roughness Ra of the surface of a monofilament. The temperature of the organic solvent's aqueous solution which is a coagulation liquid is preferably 36° C. or higher and 40° C. or lower, more preferably 36° C. or higher and 39° C. or lower for controlling the long diameter/short diameter ratio of a monofilament of the carbon fiber precursor acrylic fiber and the center line average roughness Ra of the surface of a monofilament.

In the present invention, the tensile force applied to a coagulated yarn at the time of taking up the coagulated yarn from a coagulation liquid (this tensile force is also referred to as a take-up tensile force) is preferably 55 mgf per filament or more and 75 mgf per filament or less. The method for measuring the take-up tensile force is as described in Examples.

When the take-up tensile force is 55 mgf per filament or more at the time of taking up the coagulated yarn from the coagulation liquid, it is possible to prevent a situation in which the coagulated yarn is loosened and spread in the coagulation liquid and failed to be taken up. In addition, it is possible to prevent an excessive decrease in long diameter/short diameter ratio of a monofilament of the resulting carbon fiber precursor acrylic fiber and center line average roughness Ra of the surface of a monofilament.

Further, when the take-up tensile force is 75 mgf per filament or less at the time of taking up the coagulated yarn from the coagulation liquid, it is possible to prevent an excessive increase in long diameter/short diameter ratio of a monofilament of the resulting carbon fiber precursor acrylic fiber and center line average roughness Ra of the surface of a monofilament.

From the viewpoint of controlling the long diameter/short diameter ratio of a monofilament of carbon fiber precursor acrylic fiber and the center line average roughness Ra of the surface of a monofilament and stably producing a carbon fiber precursor acrylic fiber bundle, the take-up tensile force is more preferably 57 fmg per filament or more and 71 mgf per filament or less at the time of taking up the coagulated yarn from the coagulation liquid.

The coagulated yarn taken up may be drawn in the air in a state of being soaked with the coagulation liquid. The draw ratio in the air is preferably 1.00 or more and 1.15 or less. When the draw ratio is 1.15 or less, excessive drawing can be suppressed. From the viewpoint of high strand strength of a carbon fiber bundle to further improve the performance of a CFRP tank, the draw ratio is more preferably 1 or more and 1.05 or less.

In the present invention, the coagulated yarn is washed/drawn subsequently to being drawn in the air. The washing method may be any method as long as the solvent can be removed. For example, the coagulated yarn is washed/drawn in a multistage washing/drawing bath set at a temperature of 50° C. or higher and lower than 100° C. Here, the number of stages in the washing/drawing bath is not particularly limited, but is appropriately about 3 or more and 10 or less, preferably 4 or more and 7 or less. The draw ratio is preferably 2.4 or more and 2.8 or less.

When the draw ratio is 2.4 or more, it is possible to produce carbon fiber precursor acrylic fiber having a sufficient molecular orientation, and resultantly, the strand strength of a carbon fiber bundle can be high. In addition, it is possible to prevent an excessive decrease in the center line average roughness Ra of the surface of a monofilament of the resulting carbon fiber precursor acrylic fiber. Further, when the draw ratio is 2.8 or less, it is possible to prevent breakage of a fibril structure and formation of defect points on carbon fiber precursor acrylic fiber due to excessive drawing, and resultantly, the strand strength of a carbon fiber bundle can be high. In addition, it is possible to prevent an excessive increase in the center line average roughness Ra of the surface of a monofilament of the resulting carbon fiber precursor acrylic fiber. From the viewpoint of high strand strength of a carbon fiber bundle to further improve the performance of a CFRP tank, the draw ratio is more preferably 2.4 or more and 2.7 or less, still more preferably 2.5 or more and 2.7 or less.

Preferably, a yarn obtained by washing/drawing is relaxed or drawn at a ratio of 0.97 or more and 1.1 or less in hot water at 95° C. or higher and lower than 100° C. to obtain a drawn yarn. When the draw ratio is 0.97 or more, it is possible to prevent a situation in which a fiber bundle is loosened and failed to be taken up, and thus strain resulting from drawing in the previous step can be relaxed. Further, when the draw ratio is 1.1 or less, excessive drawing can be suppressed, so that it is possible to prevent breakage of a fibril structure and formation of defect points on carbon fiber precursor acrylic fiber. From the viewpoint of high strength of carbon fiber and stably producing carbon fiber precursor acrylic fiber, the draw ratio in hot water is more preferably 0.97 or more and 1.05 or less.

The total draw ratio until a drawn yarn is obtained by drawing a coagulated yarn in hot water after the coagulated yarn is taken up is preferably 2.4 or more and 2.9 or less. When the draw ratio is 2.4 or more, it is possible to produce carbon fiber precursor acrylic fiber having sufficient orientation, and resultantly, the strand strength of a carbon fiber bundle can be high. In addition, it is possible to prevent an excessive decrease in the center line average roughness Ra of the surface of a monofilament of the resulting carbon fiber precursor acrylic fiber. Further, when the draw ratio is 2.9 or less, it is possible to prevent breakage of a fibril structure and formation of defect points on carbon fiber precursor acrylic fiber due to excessive drawing. In addition, it is possible to prevent an excessive increase in the center line average roughness Ra of the surface of a monofilament of the resulting carbon fiber precursor acrylic fiber. From the viewpoint of high strand strength of a carbon fiber bundle to further improve the performance of a CFRP tank, the total draw ratio until a drawn yarn is obtained by drawing a coagulated yarn in hot water at 95° C. or higher and lower than 100° C. after the coagulated yarn is taken up is more preferably 2.4 or more and 2.7 or less, still more preferably 2.5 or more and 2.7 or less.

It is preferable to provide the drawn yarn obtained by drawing the coagulated yarn in water at 95° C. or higher and lower than 100° C. with an oil composition. The oil composition can be determined in view of, including, desired performance of carbon fiber precursor acrylic fiber, and is preferably, for example, a silicone-based oil composition. As needed, the oil composition may further contain additives such as an antioxidant, an antistatic agent, a defoaming agent, a preservative, an antibacterial agent and a penetrant. As a method for providing a drawn yarn with an oil composition, any known methods such as a roller method, a guide method, a spraying method or a dipping method can be used. The drawn yarn on which the oil composition is deposited is subsequently dried in a drying step to turn into dry fiber. The dry fiber can also be used as carbon fiber precursor acrylic fiber.

In the drying step, a drawn yarn can be dried by any conventionally known methods, and preferred methods include, for example, drying with heating rollers. The number of heating rollers may be 1, 2 or more.

The dry fiber can also be drawn in a pressurized steam atmosphere to obtain carbon fiber precursor acrylic fiber. Here, the temperature of the pressurized steam atmosphere is preferably 130° C. or higher and 160° C. or lower. Further, the draw ratio in the pressurized steam atmosphere is preferably 3.0 or more and 4.5 or less.

When the temperature of the pressurized steam atmosphere is 130° C. or higher, the dry fiber is sufficiently plasticized, and thus do not rupture even at a high draw ratio, and it is possible to reduce the amount of fluff present in the resulting carbon fiber precursor acrylic fiber, resulting in the stable quality of carbon fiber obtained by stabilization and carbonization. Further, when the temperature of the pressurized steam atmosphere is 160° C. or lower, oxidation reactions and decomposition reactions can be suppressed during drawing in the pressurized steam atmosphere, and therefore resultantly, reduction in the strand strength of the resulting carbon fiber bundle can be prevented.

When the draw ratio in the pressurized steam atmosphere is 3.0 or more, the molecular orientation of the resulting carbon fiber precursor acrylic fiber is improved, so that the strand strength of the resulting carbon fiber bundle is enhanced. Further, when the draw ratio in the pressurized steam atmosphere is 4.5 or less, excessive drawing can be suppressed, so that it is possible to prevent breakage of a fibril structure and formation of defect points on carbon fiber precursor acrylic fiber.

From the viewpoint of enhancing the strand strength of a carbon fiber bundle and improving drawing stability, the draw ratio in the pressurized steam atmosphere is more preferably 3.3 or more and 4.3 or less.

The total draw ratio until the drawing in the pressurized steam atmosphere is completed after the coagulated yarn is taken up is preferably 9.0 or more and 12 or less. When the total draw ratio is 9.0 or more, it is possible to prevent insufficiency of the molecular orientation of carbon fiber precursor acrylic fiber due to insufficient drawing, and resultantly, the strand strength of a carbon fiber bundle can be high. When the total draw ratio is 12 or less, it is possible to prevent breakage of a fibril structure and formation of defect points on carbon fiber precursor acrylic fiber, and resultantly, the strand strength of a carbon fiber bundle can be high. From the viewpoint of high strand strength of a carbon fiber bundle, the total draw ratio is more preferably 9 or more and 11 or less.

The pressurized steam forming an atmosphere in which the dry fiber is drawn is preferably pressurized saturated steam.

The carbon fiber precursor acrylic fiber obtained after drying or by drawing in the pressurized steam atmosphere is cooled to an ordinary-temperature state by, for example, a method in which the fiber is brought into contact with a roll at room temperature. The cooled carbon fiber precursor acrylic fiber is wound around a bobbin by a winder, or put and stored in a can, and used for production of carbon fiber.

Thus, the carbon fiber precursor acrylic fiber of the present invention can be preferably produced by a method including the following steps 1) to 3):

1) preparing a coagulated yarn by discharging an acrylonitrile-based polymer solution into a coagulation liquid having a coagulation liquid concentration of 65% by mass or more and 70% by mass or less and a coagulation liquid temperature of 36° C. or higher and 40° C. or lower, through a spinneret to coagulate the acrylonitrile-based polymer solution, and simultaneously taking up the coagulated yarn while controlling a tensile force applied to the coagulated yarn to be 55 mgf per filament or more and 75 mgf per filament or less;

2) drawing the coagulated yarn taken up in the step 1) at a ratio of 1.00 or more and 1.15 or less in the air, then washing the coagulated yarn in a washing/drawing bath with water at 50° C. or higher simultaneously drawing the coagulated yarn at a ratio of 2.4 or more and 2.7 or less, wherein the washing/drawing bath has 4 or more and 7 or less stages, and further relaxing or drawing the coagulated yarn at a ratio of 0.97 or more and 1.1 or less in a hot water bath with water at 95° C. or higher to obtain a drawn yarn; and 3) providing the drawn yarn after drawing in the step 2) with an oil agent, drying, and then drawing the yarn at a ratio of 3.0 or more and 4.5 or less in a pressurized steam atmosphere at 130° C. or higher and 160° C. or lower;

and meeting the following requirements 4) and 5):

4) the total draw ratio of the coagulated yarn until the drawn yarn is obtained in the step 2) after the coagulated yarn is taken up in the step 1) is 2.4 or more and 2.7 or less; and 5) the total draw ratio until the drawing in the pressurized steam atmosphere in the step 3) is completed after the coagulated yarn is taken up from the coagulation liquid in the step 1) is 9.0 or more and 12 or less.

The carbon fiber of the present invention is obtained by stabilizing and carbonizing the carbon fiber precursor acrylic fiber.

In the carbon fiber of the present invention, the center line average roughness Ra of the surface of a monofilament is 6.0 nm or more and 13 nm or less.

In the present invention, by setting the center line average roughness Ra of the surface of a monofilament of carbon fiber to 6.0 nm or more, excessive bundling of a carbon fiber bundle composed of monofilaments of carbon fiber can be suppressed, so that the carbon fiber bundle is easily impregnated with resin. Further, by setting the center line average roughness Ra of the surface of a monofilament of carbon fiber to 13 nm or less, insufficiency of bundling of a carbon fiber bundle composed of monofilaments of carbon fiber can be prevented, so that the carbon fiber bundle is easily uniformly impregnated with resin.

From the viewpoint of obtaining a CFRP tank having high strength, the center line average roughness Ra of the surface of the monofilament of the carbon fiber is more preferably 10 nm or less. The center line average roughness Ra of the surface of the monofilament of the carbon fiber can be measured by a method as described in Examples.

In the carbon fiber of the present invention, a long diameter/short diameter ratio of a monofilament of the carbon fiber is 1.11 or more and 1.245 or less. In the present invention, by setting the long diameter/short diameter ratio of a monofilament of the carbon fiber to 1.11 or more, sufficient gaps can be secured between monofilaments of the carbon fiber, so that the carbon fiber bundle is easily impregnated with resin. Further, by setting the long diameter/short diameter ratio of a monofilament of the carbon fiber to 1.245 or less, excessive generation of gaps between monofilaments of the carbon fiber is prevented, so that the carbon fiber bundle is easily uniformly impregnated with resin.

From the viewpoint of obtaining a CFRP tank having high strength, the long diameter/short diameter ratio of a monofilament of the carbon fiber is more preferably 1.135 or more. The long diameter/short diameter ratio of a monofilament of the carbon fiber is defined similarly to the long diameter/short diameter ratio of a monofilament of a carbon fiber precursor acrylic fiber, and can be measured in the same manner as in the case of the long diameter/short diameter ratio of a monofilament of the carbon fiber precursor acrylic fiber.

In the carbon fiber of the present invention, a recess distance/short diameter ratio of a monofilament is preferably 0.011 or more and 0.018 or less.

In the present invention, by setting the recess distance/short diameter ratio of a monofilament of the carbon fiber to 0.011 or more, sufficient gaps can be secured between monofilaments of the carbon fiber, so that the carbon fiber bundle is easily impregnated with resin. Further, by setting the recess distance/short diameter ratio of a monofilament of the carbon fiber to 0.018 or less, excessive generation of gaps between monofilaments of the carbon fiber is prevented, so that the carbon fiber bundle is easily uniformly impregnated with resin.

From the viewpoint of enhancing the strength of a CFRP tank, the recess distance/short diameter ratio of a monofilament of the carbon fiber is more preferably 0.0145 or more. The recess distance/short diameter ratio of a monofilament of the carbon fiber is defined similarly to the recess distance/short diameter ratio of a monofilament of a carbon fiber precursor acrylic fiber, and can be measured in the same manner as in the case of the recess distance/short diameter ratio of a monofilament of the carbon fiber precursor acrylic fiber.

Carbon fiber can be obtained by stabilizing and carbonizing carbon fiber precursor acrylic fiber. Conditions for stabilization and carbonization are not particularly limited, but it is preferable to set conditions under which structural defects such as voids are hardly generated in the fiber. Stabilization is a treatment in which carbon fiber precursor acrylic fiber is heated under the condition of tension or drawing in an oxidizing atmosphere to obtain stabilized fiber. Examples of the method for stabilization include a hot-air circulation method, a method using fixed hot plate having a porous surface, and a heating roll method. The heating temperature in stabilization is preferably, for example, 200° C. or higher and 300° C. or lower. In stabilization, it is preferable to perform treatment until the density of stabilized fiber is 1.3 g/cm$^3$ or more and 1.5 g/cm$^3$ or less.

Carbonization is a treatment in which stabilized fiber obtained by stabilization is heated in an inert gas atmosphere to obtain carbon fiber. Preferably, carbonization includes pre-carbonization and high-temperature carbonization. In the per-carbonization, the stabilized fiber is heated under tension in an inert gas atmosphere at a maximum temperature of 550° C. or higher and 800° C. or lower to obtain pre-carbonized fiber. By the pre-carbonization, the mechanical properties of the carbon fiber can be improved. As the inert gas, any known inert gases such as nitrogen, argon or helium can be employed, and nitrogen is desirable from the viewpoint of economy.

In the high-temperature carbonization, the pre-carbonized fiber is caused to pass through an inert gas atmosphere at 1200° C. or higher and 3000° C. or lower, whereby the pre-carbonized fiber is heated to obtain carbon fiber. By the high-temperature carbonization, the mechanical properties of the carbon fiber can be improved. The inert gas that can be used is the same as the inert gas which can be employed in the pre-carbonization operation.

Thus, the carbon fiber of the present invention can be preferably produced by a method including the following steps 7) to 9):

7) a stabilization step of heating a carbon fiber precursor acrylic fiber bundle composed of a carbon fiber precursor acrylic fiber according to the present invention in an oxidizing atmosphere at 200° C. or higher and 300° C. or lower to obtain a stabilized fiber bundle;
8) a pre-carbonization step of heating the stabilized fiber bundle at 550° C. or higher and 800° C. or lower in a non-oxidizing atmosphere to obtain a pre-carbonized fiber bundle; and
9) a high-temperature carbonization step of heating the pre-carbonized fiber bundle at 1200° C. or higher and 3000° C. or lower to obtain a carbon fiber bundle.

Preferably, the obtained carbon fiber is subjected to a surface treatment. The surface treatment method may be any known method, and examples thereof include oxidation treatment methods including electrolytic oxidation, chemical oxidation and air oxidation. After electrolytic oxidation treatment, washing treatment is performed for removing an electrolyte on the surface of carbon fiber, and impurities deposited by the electrolytic oxidation treatment, and subsequently, the carbon fiber bundle is dried. For the drying method, any known technique such as roll drying, hot air drying or radiant heat drying can be employed.

Preferably, the carbon fiber is then subjected to a sizing treatment. The sizing treatment can be performed in the following manner: the carbon fiber is provided with a sizing liquid obtained by dissolving a sizing agent in an organic solvent, or a sizing liquid which is an emulsion liquid obtained by dispersing the sizing agent into water with an emulsifier and the like, and is dried. The amount of the sizing agent deposited on the carbon fiber can be controlled by adjusting the concentration of the sizing agent in the sizing liquid or adjusting the amount of the sizing liquid deposited by adjusting the amount squeezed. From the viewpoint of productivity, the method for depositing the sizing liquid on the carbon fiber is preferably a method in which carbon fiber bundles to be run are arranged side by side at equal intervals, formed into a sheet, and immersed in the sizing liquid.

Not only does the carbon fiber thus obtained have high strand strength, but a CFRP tank produced using the carbon fiber also has high strength.

EXAMPLES

Hereinafter, the present invention will be described in detail by way of Examples, but the present invention is not limited to Examples.

[Coagulated Yarn Take-Up Tensile Force]

A tensile force for taking up the coagulated yarn bundle was measured from a force applied to the first guide after taking up the coagulated yarn from a coagulation liquid, in which the coagulated yarn had been discharged through nozzle and formed, and the measured tensile force was converted into a tensile force per filament to calculate a coagulated yarn take-up tensile force.

[Long Diameter/Short Diameter Ratio of Monofilament]

A fiber bundle for measurement was inserted into a poly(vinyl chloride) tube having an inner diameter of 1 mm, and this was cut into round slices with a knife to prepare a sample. The sample was then bonded to a SEM sample stand in such a manner that the fiber cross-section faced upward, gold was deposited in a thickness of about 10 nm by sputtering, and the fiber cross-section was then observed with an electron microscope (manufactured by Koninklijke Philips N.V., product name: XL 20 Scan Type) under the condition of an accelerating voltage of 7.00 kV and an operation distance of 31 mm. Among the monofilaments, of which cross-sections had been observed, 100 monofilaments were randomly selected, and for each of the cross-sections of the monofilaments, a rectangle circumscribing the cross-section and having the smallest area was determined. A ratio of the length of the long side to the length of the short side of the rectangle was determined, and an average for the 100 monofilaments was defined as a long diameter/short diameter ratio of a monofilament of a fiber bundle.

[Center Line Average Roughness Ra of Surface of Monofilament]

Using a carbon paste, both ends of a fiber bundle for measurement were fixed onto a SPA 400 metallic sample stand (20 mm diameter) attached to a scanning probe microscope apparatus (manufactured by Epolead Service Inc., model: K-Y10200167, and measurement was performed under the following conditions.

[Scanning Probe Microscope Measurement Conditions]

Apparatus: SPI 4000 Probe Station, SPA 400 (Unit) manufactured by SII NanoTechnology Inc.

Scanning mode: dynamic force mode (DFM) (shape image measurement)

Probe: SI-DF-20 manufactured by SII NanoTechnology Inc.

Scanning range: 2 μm×2 μm

Rotation: 90°

Scanning speed: 1.0 Hz

Pixel number: 512×512

Measurement environment: room temperature, in air

For one monofilament, one image was obtained under the above-described conditions, and the obtained image was subjected to image analysis using image analysis software (SPIWin) attached to a scanning probe microscope.

[Image Analysis Conditions]

The obtained shape image is subjected to [flat processing], [median 8 processing] and [cubic inclination correction] to obtain an image in which a curved surface is turned into a flat surface through fitting correction. A center line average roughness Ra is determined by analyzing the surface roughness of the image subjected to flat surface correction.

[Flat Treatment]

Z-axis-direction distortions and waves appearing on image data due to lifting, vibration, scanner creeping and the like are removed, and data distortions caused by an apparatus in scanning probe microscope measurement are removed.

[Median 8 Treatment]

All the Z-axis data of the obtained shape image in a range of 3×3 is treated with a median filter.

[Cubic Slope Correction]

From all the data of images to be processed, a tertiary curved surface is determined by least squares approximation, and the cubic curved surface is subjected to fitting.

In measurement of the center line average roughness Ra of the surface of a monofilament of a fiber bundle, 10 monofilaments are randomly taken for one fiber bundle, and for each of the monofilaments, an image is obtained by use of a scanning probe microscope, and analyzed to measure a center line average roughness Ra of the fiber surface. An average of the obtained Ra values of the 10 monofilaments was defined as a center line average roughness Ra of the surface of a monofilament of the fiber bundle for measurement.

[Recess Distance/Short Diameter Ratio of Monofilament]

As in measurement of a long diameter/short diameter ratio of a monofilament, 100 monofilaments were randomly selected, and for each of the cross-sections of the monofilaments, a rectangle circumscribing the cross-section and having the smallest area was determined. A length of the short side of the rectangle was measured. Further, a recess distance (see FIG. 2) was measured for the same cross-section. A ratio of the recess distance and the length of the short side measured in this way was calculated, and an average of the calculated ratios for the 100 monofilaments was defined as a recess distance/short diameter ratio of a monofilament of the fiber bundle. For each of the monofilaments, one of the long sides of rectangle 2 circumscribing cross-section 1 of the monofilament and having the smallest area is often coincident with straight line 3 drawn for determining the recess distance of cross-section 1 (FIGS. 3 and 5), but there are cases where one of the long sides of rectangle 2 is not coincident with straight line 3 (FIG. 2). Further, in the case where it was not possible to draw a straight line contacting cross-section 1 at two points because the circumference of cross-section 1 was a convex closed curve (FIG. 4), a recess distance Z was considered to be 0.

[Strand Strength of Carbon Fiber Bundle]

The strand strength of a carbon fiber bundle was measured in accordance with the epoxy-resin impregnated strand testing specified in JIS-R-7608. The number of measurements was 10, and an average of the measurements was evaluated.

[Pressure Vessel Breaking Pressure]

Using a filament winding apparatus, a carbon fiber bundle was wound around an aluminum liner (total length: 540 mm, barrel length: 415 mm, barrel outer diameter: 163 mm, thickness at center of barrel: 3 mm) having a capacity of 9 littles. The aluminum liner used is composed of a material obtained by subjecting to heat treatment an aluminum material specified as A6061-T6 in JIS H 4040. The position of the carbon fiber bundle was adjusted via an unwinding guide roll, and subsequently, the carbon fiber bundle was supplied and impregnated with a constant amount of matrix resin using a touch roll, and then wound around the liner to prepare an intermediate vessel. Concerning a method for winding the carbon fiber bundle around the liner, first a hoop layer forming an angle of 88.6° with respect to the liner rotation axis direction was formed on the barrel, a helical layer supporting heads of the liner at an angle of 11.0° with respect to the liner rotation axis direction was then stacked, a hoop layer forming an angle of 65.0° with respect to the liner rotation axis direction was then formed on the barrel, a helical layer supporting the heads of the liner at an angle of 13.0° with respect to the liner rotation axis direction was then stacked, a hoop layer forming an angle of 88.6° with respect to the liner rotation axis direction was formed again on the barrel, and a helical layer supporting the heads of the liner at an angle of 11.0° with respect to the liner rotation axis direction was then stacked.

The obtained intermediate vessel was removed from the filament winding apparatus, and suspended in a heating furnace, the internal temperature of the furnace was elevated to 110° C. at a ratio of 2° C./min, and the intermediate vessel was then held at 110° C. for 2 hours to cure the intermediate vessel. Thereafter, the internal temperature of the furnace was lowered to 60° C. at a ratio of 1° C./min to obtain a CFRP tank.

The CFRP tank was set in a hydraulic pressure breakage tester, the inside of the CFRP tank was filled with water, a hydraulic pressure was then applied to the CFRP tank while the pressure was increased at a rate of 15 MPa/min, and a hydraulic pressure at which the CFRP tank was broken was recorded and defined as a CFRP tank breaking pressure.

Example 1

[Production of Acrylonitrile-Based Polymer Solution]

Acrylonitrile, acrylamide and methacrylic acid were added into water, and copolymerized by aqueous suspension polymerization in the presence of ammonium persulfate-ammonium hydrogensulfite and iron sulfate to obtain an acrylonitrile-based polymer having acrylonitrile units/acrylamide units/methacrylic acid units of 97/2/1 (mass ratio). The acrylonitrile-based polymer was dissolved into dimethylacetamide to produce a 21 mass % acrylonitrile-based polymer solution.

[Production of Carbon Fiber Precursor Acrylic Fiber Bundle]

A coagulated yarn was prepared by discharging the thus-obtained acrylonitrile-based polymer solution into a coagulation liquid of a dimethylacetamide aqueous solution having a concentration of 67% by mass and a temperature of 38° C. through a spinning nozzle having a hole diameter of 50 μm and a hole number of 30000, and simultaneously taken up while controlling the tensile force applied to the coagulated yarn was 70 mgf per filament.

The coagulated yarn taken up was drawn at a ratio of 1.01 in the air, subsequently drawn at a ratio of 2.60 and simultaneously washed through a five-stage drawing/washing bath with water at 50° C. to 98° C., and then drawn (relaxed) at a ratio of 0.98 in a hot water bath with water at 98° C. to obtain a drawn yarn. The obtained drawn yarn was immersed in an amino-modified silicone-based oil dispersion liquid, and densified with a heating roller at 140° C. to obtain a dry fiber bundle. The amino-modified silicone-based oil dispersion liquid used here is one produced by mixing 85 parts by mass of amino-modified silicone (manufactured by Shin-Etsu Chemical Co., Ltd., trade name: KF-865) with 15 parts by mass of an emulsifier (manufactured by Nikko Chemicals Co., Ltd., trade name: NIKKOL BL-9EX), emulsifying the resulting mixture by a Gaulin mixer (manufactured by SMT Co., Ltd., trade name: Pressure Homogenizer Gaulin Type), and then adding water. The total draw ratio until the drawn yarn treated in the hot water bath was obtained after the coagulated yarn was taken up was 2.57. The obtained dry fiber bundle was then drawn at a ratio of 3.50 in a pressurized saturated steam atmosphere at about 150° C. to produce a carbon fiber precursor acrylic fiber bundle having a monofilament fineness of 1.0 dtex. The total draw ratio until the drawing in a pressurized saturated steam atmosphere was completed after the coagulated yarn was taken up was 9.01.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament) were measured in accordance with the methods described above. Measurement results are shown in Table 2.

[Production of Carbon Fiber Bundle]

The obtained carbon fiber precursor acrylic fiber bundle was introduced into a stabilization furnace, and the carbon fiber precursor acrylic fiber bundle was made blown by air heated at 220° C. to 280° C. to stabilize. In this way, a stabilized fiber bundle having a density of 1.35 g/cm$^3$ was obtained. The elongation ratio was −4.0%, and the stabilization treatment time was 70 minutes.

Next, the stabilized fiber bundle was caused to pass through a first carbonization furnace having a temperature gradient of from 300° C. to 700° C. in nitrogen while the fiber bundle was elongated by 4.0%. In the first carbonization furnace, the temperature gradient was set to be linear, and the treatment time was 1.3 minutes. Further, the fiber bundle was caused to pass through a second carbonization furnace set to have a temperature gradient of from 1000° C. to 1600° C. in a nitrogen atmosphere while the fiber bundle was elongated by −4.5%. In this way, a carbon fiber bundle was obtained. The treatment time in the second carbonization furnace was 1.3 minutes.

Subsequently, the carbon fiber bundle was caused to run through a 10 mass % ammonium bicarbonate aqueous solution, electricity was generated between the carbon fiber bundle as an anode and a counter electrode in such a manner that the amount of electricity was 30 coulombs per 1 g of carbon fiber to be treated, and the carbon fiber bundle was washed with water at 50° C., and then dried.

Next, an aqueous dispersion liquid of HYDRAN N320 (manufactured by DIC Corporation) was added, drying was performed, and the carbon fiber bundle to which the sizing agent was deposited in an amount of 0.8% by mass was wound around a bobbin.

The physical properties of the obtained carbon fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Example 2

Except that in production of a carbon fiber precursor acrylic fiber bundle, the coagulated yarn made from the acrylonitrile-based polymer solution used in Example 1 using a nozzle having a hole diameter of 45 μm was taken up while controlling the tensile force applied to the coagulated yarn was 60 mgf per filament, and the draw ratio in a pressurized saturated steam atmosphere was 4.20, the same procedure as in Example 1 was carried out. The total draw ratio until the drawn yarn treated in a hot water bath was obtained after the coagulated yarn was taken up was 2.57, and the total draw ratio until the drawing in a pressurized saturated steam atmosphere was completed after the coagulated yarn was taken up was 10.8.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Example 3

Except that in production of a carbon fiber precursor acrylic fiber bundle, the coagulated yarn made from the acrylonitrile-based polymer solution used in Example 1 was taken up while controlling the tensile force applied to the coagulated yarn was 72 mgf per filament, and the draw ratio in a pressurized saturated steam atmosphere was 4.20, the same procedure as in Example 1 was carried out. The total draw ratio until the drawn yarn treated in a hot water bath was obtained after the coagulated yarn was taken up was 2.57, and the total draw ratio until the drawing in a pressurized saturated steam atmosphere was completed after the coagulated yarn was taken up was 10.8.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Example 4

Except that in production of a carbon fiber precursor acrylic fiber bundle, the concentration of a dimethylacetamide aqueous solution being a coagulation liquid was 69% by mass, and the tensile force applied to a coagulated yarn was controlled to 65 mgf per filament, the same procedure as in Example 1 was carried out.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Reference Example 1

Except that in production of a carbon fiber precursor acrylic fiber bundle, the temperature of a dimethylacetamide aqueous solution being a coagulation liquid was 35° C., and the tensile force applied to a coagulated yarn was controlled to 74 mgf per filament, the same procedure as in Example 1 was carried out.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Reference Example 2

Except that in production of a carbon fiber precursor acrylic fiber bundle, the draw ratio in a drawing/washing bath was 2.80, the same procedure as in Example 1 was carried out. The total draw ratio until the drawn yarn treated in a hot water bath was obtained after the coagulated yarn was taken up was 2.77, and the total draw ratio until the drawing in a pressurized saturated steam atmosphere was completed after the coagulated yarn was taken up was 9.70.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Comparative Example 1

In production of a carbon fiber precursor acrylic fiber bundle, a coagulated yarn was prepared by discharging the acrylonitrile-based polymer solution used in Example 1 into a coagulation liquid containing a dimethylacetamide aqueous solution having a concentration of 65% by mass and a temperature of 30° C. through a spinning nozzle having a hole diameter of 75 μm and a hole number of 30000, and simultaneously taken up while controlling the tensile force applied to the coagulated yarn was 60 mgf per filament. The coagulated yarn taken up was not drawn in the air, but drawn again at a ratio of 2.00 in the dimethylacetamide aqueous solution having a concentration of 65% by mass and a temperature of 30° C. Thereafter, the same procedure as in Example 1 was carried out except that the draw ratio in a drawing/washing bath was 4.00, and the draw ratio in a pressurized saturated steam atmosphere was 2.00. The total draw ratio until the drawn yarn treated in a hot water bath was obtained after the coagulated yarn was taken up was 7.84, and the total draw ratio until the drawing in a pressurized saturated steam atmosphere was completed after the coagulated yarn was taken up was 15.7.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament was almost comparable to that in Example 1, but the recess distance/short diameter ratio of a monofilament and the center line average roughness Ra of the surface of a monofilament were larger as compared to Example 1. Further, the strand strength of the carbon fiber bundle and the pressure vessel breaking pressure were 4400 MPa and 80 MPa, respectively, and lower as compared to Example 1.

Comparative Example 2

In production of a carbon fiber precursor acrylic fiber bundle, a coagulated yarn was prepared by discharging the acrylonitrile-based polymer solution used in Example 1 into a coagulation liquid containing a dimethylacetamide aqueous solution having a concentration of 60% by mass and a temperature of 30° C. through a spinning nozzle having a hole diameter of 75 μm and a hole number of 30000, and simultaneously taken up while controlling the tensile force applied to the coagulated yarn was 95 mgf per filament. The coagulated yarn taken up was not drawn in the air, but drawn again at a ratio of 1.20 in the dimethylacetamide aqueous solution having a concentration of 60% by mass and a temperature of 30° C. Thereafter, the same procedure as in Example 1 was carried out except that the draw ratio in a drawing/washing bath was 4.00, and the draw ratio in a pressurized saturated steam atmosphere was 2.00. The total draw ratio until the drawn yarn treated in a hot water bath was obtained after the coagulated yarn was taken up was 4.70, and the total draw ratio until the drawing in a pressurized saturated steam atmosphere was completed after the coagulated yarn was taken up was 9.41.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament, the recess distance/short diameter ratio of a monofilament and the center line average roughness Ra of the surface of a monofilament were larger as compared to Example 1. Further, the strand strength of the carbon fiber bundle and the pressure vessel breaking pressure were 4400 MPa and 80 MPa, respectively, and lower as compared to Example 1.

Comparative Example 3

Except that in production of a carbon fiber precursor acrylic fiber bundle, the coagulated yarn made from the acrylonitrile-based polymer solution used in Example 1 was taken up while controlling the tensile force applied to the coagulated yarn was 74 mgf per filament, the draw ratio in the air was 1.05, and the draw ratio in a drawing/washing bath was 3.00, the same procedure as in Example 1 was carried out. The total draw ratio until the drawn yarn treated in a hot water bath was obtained after the coagulated yarn was taken up was 3.09, and the total draw ratio until the drawing in a pressurized saturated steam atmosphere was completed after the coagulated yarn was taken up was 10.8.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament, the recess distance/short diameter ratio of a monofilament and the center line average roughness Ra of the surface of a monofilament were lower as compared to Example 1. Further, the strand strength of the carbon fiber bundle and the pressure vessel breaking pressure were 5500 MPa and 110 MPa, respectively, and lower as compared to Example 1.

Comparative Example 4

Except that in production of a carbon fiber precursor acrylic fiber bundle, the draw ratio in the air was 1.20, the draw ratio in a drawing/washing bath was 4.00, and the draw ratio in a pressurized saturated steam atmosphere was 2.60, the same procedure as in Example 1 was carried out. The total draw ratio until the drawn yarn treated in a hot water bath was obtained after the coagulated yarn was taken up was 4.70, and the total draw ratio until the drawing in a pressurized saturated steam atmosphere was completed after the coagulated yarn was taken up was 12.2.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the center line average roughness Ra of the surface of a monofilament was almost comparable to that in Example 1, but the long diameter/short diameter ratio of a monofilament and the recess distance/short diameter ratio of a monofilament were lower as compared to Example 1. Further, the strand strength of the carbon fiber bundle and the pressure vessel breaking pressure were 5350 MPa and 110 MPa, respectively, and lower as compared to Example 1.

Comparative Example 5

In production of a carbon fiber precursor acrylic fiber bundle, the coagulated yarn made from the acrylonitrile-based polymer solution used in Example 1 was taken up while controlling the tensile force applied to the coagulated yarn was 49 mgf per filament, the coagulated yarn taken up was then drawn at a ratio of 1.05 in the air, and drawn at a ratio of 1.50 in a dimethylacetamide aqueous solution having a concentration of 35% by mass and a temperature of 55° C. Thereafter, the same procedure as in Example 1 was carried out except that the draw ratio in a drawing/washing bath was 1.70, and the draw ratio in a hot water bath was 2.00. The total draw ratio until the drawn yarn treated in a hot water bath was obtained after the coagulated yarn was taken up was 5.36, and the total draw ratio until the drawing in a pressurized saturated steam atmosphere was completed after the coagulated yarn was taken up was 18.7.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament and the center line average roughness Ra of the surface of a monofilament were lower as compared to Example 1. The monofilament had no recess (recess distance/short diameter ratio of a monofilament=0.000). The strand strength of the carbon fiber bundle was 6000 MPa, and higher as compared to Example 1, but the pressure vessel breaking pressure was 120 MPa, and lower as compared to Example 1.

Comparative Example 6

Except that in production of a carbon fiber precursor acrylic fiber bundle, the temperature of a dimethylacetamide aqueous solution being a coagulation liquid was 30° C., the tensile force applied to a coagulated yarn was controlled to 85 mgf per filament, and the draw ratio in a pressurized saturated steam atmosphere was 4.20, the same procedure as in Example 1 was carried out. The total draw ratio until the drawn yarn treated in a hot water bath was obtained after the coagulated yarn was taken up was 2.57, and the total draw ratio until the drawing in a pressurized saturated steam atmosphere was completed after the coagulated yarn was taken up was 10.8.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament, the recess distance/short diameter ratio of a monofilament and the center line average roughness Ra of the surface of a monofilament were larger as compared to Example 1. The strand strength of the carbon fiber bundle was 6000 MPa, and higher as compared to Example 1, but the pressure vessel breaking pressure was 123 MPa, and lower as compared to Example 1.

Comparative Example 7

Except that in production of a carbon fiber precursor acrylic fiber bundle, the concentration of a dimethylacetamide aqueous solution being a coagulation liquid was 63% by mass, the tensile force applied to a coagulated yarn was controlled to 88 mgf per filament, and the draw ratio in a pressurized saturated steam atmosphere was 4.20, the same procedure as in Example 1 was carried out. The total draw ratio until the drawn yarn treated in a hot water bath was obtained after the coagulated yarn was taken up was 2.57, and the total draw ratio until the drawing in a pressurized saturated steam atmosphere was completed after the coagulated yarn was taken up was 10.8.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament, the recess distance/short diameter ratio of a monofilament and the center line average roughness Ra of the surface of a monofilament were larger as compared to Example 1. The strand strength of the carbon fiber bundle was 6000 MPa, and higher as compared to Example 1, but the pressure vessel breaking pressure was 122 MPa, and lower as compared to Example 1.

Comparative Example 8

Except that in production of a carbon fiber precursor acrylic fiber bundle, the concentration of a dimethylacetamide aqueous solution being a coagulation liquid was 65% by mass, the tensile force applied to a coagulated yarn was controlled to 68 mgf per filament, the coagulated yarn was not drawn in the air, the draw ratio in a drawing/washing bath was 3.40, and the draw ratio in a pressurized saturated steam atmosphere was 2.00, the same procedure as in Example 1 was carried out. The total draw ratio until the drawn yarn treated in a hot water bath was obtained after the coagulated yarn was taken up was 3.33, and the total draw ratio until the drawing in a pressurized saturated steam atmosphere was completed after the coagulated yarn was taken up was 6.66.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament and the recess distance/short diameter ratio of a monofilament were lower as compared to Example 1, and the center line average roughness Ra of the surface of a monofilament was larger as compared to Example 1. Further, the strand strength of the carbon fiber bundle and the pressure vessel breaking pressure were 4600 MPa and 90 MPa, respectively, and lower as compared to Example 1.

Comparative Example 9

Except that in production of a carbon fiber precursor acrylic fiber bundle, the coagulated yarn made from the acrylonitrile-based polymer solution used in Example 1 was taken up while controlling the tensile force applied to a coagulated yarn was 45 mgf per filament, the draw ratio in the air was 1.30, the draw ratio in a drawing/washing bath was 2.00, the draw ratio in a hot water bath was 1.00, and the draw ratio in a pressurized saturated steam atmosphere was 5.00, the same procedure as in Example 1 was carried out. The total draw ratio until the drawn yarn treated in a hot water bath was obtained after the coagulated yarn was taken up was 2.60, and the total draw ratio until the drawing in a pressurized saturated steam atmosphere was completed after the coagulated yarn was taken up was 13.0.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament and the center line average roughness Ra of the surface of a monofilament were lower as compared to Example 1. The monofilament had no recess (recess distance/short diameter ratio of a monofilament=0.000). Further, the strand strength of the carbon fiber bundle and the pressure vessel breaking pressure were 5400 MPa and 110 MPa, respectively, and lower as compared to Example 1.

Comparative Example 10

Except that in production of a carbon fiber precursor acrylic fiber bundle, the concentration of a dimethylacetamide aqueous solution in a coagulation liquid was 75%, the same procedure as in Example 1 was carried out.

As a result, monofilaments of a coagulated yarn taken up from the coagulation liquid were bonded together, so that it was not possible to obtain a carbon fiber precursor acrylic fiber bundle. Spinning conditions for the carbon fiber precursor acrylic fiber bundle are as shown in Table 1.

Example 5

Except that in production of a carbon fiber precursor acrylic fiber bundle, the concentration of a dimethylacetamide aqueous solution being a coagulation liquid was 68% by mass, and the tensile force applied to a coagulated yarn was controlled to 74 mgf per filament, and the draw ratio in the air was 1.04, the same procedure as in Example 1 was carried out. The total draw ratio until the drawn yarn treated in a hot water bath was obtained after the coagulated yarn was taken up was 2.65, and the total draw ratio until the drawing in a pressurized saturated steam atmosphere was completed after the coagulated yarn was taken up was 9.27.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Example 6

Except that in production of a carbon fiber precursor acrylic fiber bundle, the coagulated yarn made from the acrylonitrile-based polymer solution used in Example 1 was taken up while controlling the tensile force applied to a coagulated yarn was 74 mgf per filament, the draw ratio in a drawing/washing bath was 2.50, and the draw ratio in a pressurized saturated steam atmosphere was 3.80, the same procedure as in Example 1 was carried out. The total draw ratio until the drawn yarn treated in a hot water bath was obtained after the coagulated yarn was taken up was 2.47, and the total draw ratio until the drawing in a pressurized saturated steam atmosphere was completed after the coagulated yarn was taken up was 9.40.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Example 7

Except that in production of a carbon fiber precursor acrylic fiber bundle, the concentration and the temperature of a dimethylacetamide aqueous solution being a coagulation liquid were 68% by mass and 39° C., respectively, the tensile force applied to a coagulated yarn was controlled to 60 mgf per filament, the draw ratio in the air was 1.04, and the draw ratio in a pressurized saturated steam atmosphere was 3.40, the same procedure as in Example 1 was carried out. The total draw ratio until the drawn yarn treated in a hot water bath was obtained after the coagulated yarn was taken up was 2.65, and the total draw ratio until the drawing in a pressurized saturated steam atmosphere was completed after the coagulated yarn was taken up was 9.01.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Example 8

Except that in production of a carbon fiber precursor acrylic fiber bundle, the concentration and the temperature of a dimethylacetamide aqueous solution being a coagulation liquid were 68% by mass and 39° C., respectively, the draw ratio in the air was 1.04, and the draw ratio in a pressurized saturated steam atmosphere was 3.40, the same procedure as in Example 1 was carried out. The total draw ratio until the drawn yarn treated in a hot water bath was obtained after the coagulated yarn was taken up was 2.65, and the total draw ratio until the drawing in a pressurized saturated steam atmosphere was completed after the coagulated yarn was taken up was 9.01.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/ short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Example 9

Except that in production of a carbon fiber precursor acrylic fiber bundle, the draw ratio in a pressurized saturated steam atmosphere was 4.20, the same procedure as in Example 1 was carried out. The total draw ratio until the drawn yarn treated in a hot water bath was obtained after the coagulated yarn was taken up was 2.57, and the total draw ratio until the drawing in a pressurized saturated steam atmosphere was completed after the coagulated yarn was taken up was 10.8.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Example 10

Except that in production of a carbon fiber precursor acrylic fiber bundle, the concentration and the temperature of a dimethylacetamide aqueous solution being a coagulation liquid were 68% by mass and 39° C., respectively, the hole diameter of a nozzle was 60 µm, the tensile force applied to a coagulated yarn was controlled to 73 mgf per filament, the draw ratio in the air was 1.07, and the draw ratio in a drawing/washing bath was 2.50, the same procedure as in Example 1 was carried out. The total draw ratio until the drawn yarn treated in a hot water bath was obtained after the coagulated yarn was taken up was 2.62, and the total draw ratio until the drawing in a pressurized saturated steam atmosphere was completed after the coagulated yarn was taken up was 9.18.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Example 11

Except that in production of a carbon fiber precursor acrylic fiber bundle, the concentration and the temperature of a dimethylacetamide aqueous solution being a coagulation liquid were 66% by mass and 39° C., respectively, the tensile force applied to a coagulated yarn was controlled to 74 mgf per filament, the draw ratio in the air was 1.04, and the draw ratio in a pressurized saturated steam atmosphere was 3.40, the same procedure as in Example 1 was carried out. The total draw ratio until the drawn yarn treated in a hot water bath was obtained after the coagulated yarn was taken up was 2.65, and the total draw ratio until the drawing in a pressurized saturated steam atmosphere was completed after the coagulated yarn was taken up was 9.01.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

Comparative Example 11

Except that in production of a carbon fiber precursor acrylic fiber bundle, the temperature of a dimethylacetamide aqueous solution being a coagulation liquid was 30° C., the tensile force applied to a coagulated yarn was controlled to 60 mgf per filament, and the draw ratio in a pressurized saturated steam atmosphere was 4.20, the same procedure as in Example 1 was carried out. The total draw ratio until the drawn yarn treated in a hot water bath was obtained after the coagulated yarn was taken up was 2.57, and the total draw ratio until the drawing in a pressurized saturated steam atmosphere was completed after the coagulated yarn was taken up was 10.8.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament was almost comparable to (slightly larger than) that in Example 1, but the recess distance/short diameter ratio of a monofilament and the center line average roughness Ra of the surface of a monofilament were larger as compared to Example 1. Further, the strand strength of the carbon fiber bundle and the pressure vessel breaking pressure were 5600 MPa and 123 MPa, respectively, and lower as compared to Example 1.

Comparative Example 12

Except that in production of a carbon fiber precursor acrylic fiber bundle, the temperature of a dimethylacetamide aqueous solution being a coagulation liquid was 30° C., the tensile force applied to a coagulated yarn was controlled to 60 mgf per filament, the draw ratio in a drawing/washing bath was 2.50, and the draw ratio in a pressurized saturated steam atmosphere was 4.20, the same procedure as in Example 1 was carried out. The total draw ratio until the drawn yarn treated in a hot water bath was obtained after the coagulated yarn was taken up was 2.47, and the total draw ratio until the drawing in a pressurized saturated steam atmosphere was completed after the coagulated yarn was taken up was 10.4.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament was almost comparable to (slightly larger than) that in Example 1, but the recess distance/short diameter ratio of a monofilament and the center line average roughness Ra of the surface of a monofilament were larger as compared to Example 1. Further, the strand strength of the carbon fiber bundle and the pressure vessel breaking pressure were 5700 MPa and 124 MPa, respectively, and lower as compared to Example 1.

Comparative Example 13

Except that in production of a carbon fiber precursor acrylic fiber bundle, the concentration of a dimethylacetamide aqueous solution being a coagulation liquid was 65% by mass, the tensile force applied to a coagulated yarn was controlled to 95 mgf per filament, the coagulated yarn was not drawn in the air, the draw ratio in a drawing/washing bath was 3.40, and the draw ratio in a pressurized saturated steam atmosphere was 2.00, the same procedure as in Example 1 was carried out. The total draw ratio until the drawn yarn treated in a hot water bath was obtained after the coagulated yarn was taken up was 3.33, and the total draw ratio until the drawing in a pressurized saturated steam atmosphere was completed after the coagulated yarn was taken up was 6.66.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament and the recess distance/short diameter ratio of a monofilament were almost comparable to (slightly lower than) those in Example 1, but the center line average roughness Ra of the surface of a monofilament was larger as compared to Example 1. Further, the strand strength of the carbon fiber bundle and the pressure vessel breaking pressure were 4400 MPa and 85 MPa, respectively, and lower as compared to Example 1.

Comparative Example 14

Except that in production of a carbon fiber precursor acrylic fiber bundle, the tensile force applied to a coagulated yarn was controlled to 65 mgf per filament, the draw ratio in the air was 1.20, the draw ratio in a drawing/washing bath was 3.60, and the draw ratio in a pressurized saturated steam atmosphere was 2.60, the same procedure as in Example 1 was carried out. The total draw ratio until the drawn yarn treated in a hot water bath was obtained after the coagulated yarn was taken up was 4.23, and the total draw ratio until the drawing in a pressurized saturated steam atmosphere was completed after the coagulated yarn was taken up was 11.0.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament and the recess distance/short diameter ratio of a monofilament were lower as compared to Example 1, and the center line average roughness Ra of the surface of a monofilament was almost comparable to that in Example 1. Further, the strand strength of the carbon fiber bundle and the pressure vessel breaking pressure were 5400 MPa and 115 MPa, respectively, and lower as compared to Example 1.

Comparative Example 15

Except that in production of a carbon fiber precursor acrylic fiber bundle, the tensile force applied to a coagulated yarn was controlled to 45 mgf per filament, and the draw ratio in a pressurized saturated steam atmosphere was 4.20, the same procedure as in Example 1 was carried out. The total draw ratio until the drawn yarn treated in a hot water bath was obtained after the coagulated yarn was taken up was 2.57, and the total draw ratio until the drawing in a pressurized saturated steam atmosphere was completed after the coagulated yarn was taken up was 10.8.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament and the recess distance/short diameter ratio of a monofilament were almost comparable to those in Example 1, but the center line average roughness Ra of the surface of a monofilament was lower as compared to Example 1. Further, the strand strength of the carbon fiber bundle and the pressure vessel breaking pressure were 5500 MPa and 123 MPa, respectively, and lower as compared to Example 1.

Comparative Example 16

Except that in production of a carbon fiber precursor acrylic fiber bundle, the tensile force applied to a coagulated yarn was controlled to 35 mgf per filament, the same procedure as in Example 1 was carried out.

Spinning conditions for the carbon fiber precursor acrylic fiber bundle are collectively shown in Table 1. The physical properties of the obtained carbon fiber precursor acrylic fiber bundle (long diameter/short diameter ratio of a monofilament, recess distance/short diameter ratio of a monofilament, and center line average roughness Ra of the surface of a monofilament), and the physical properties of the obtained carbon fiber precursor acrylic fiber bundle (long diameter/short diameter ratio of a monofilament, recess distance/short diameter ratio of a monofilament, center line average roughness Ra of the surface of a monofilament, strand strength, and pressure vessel breaking pressure produced using the obtained carbon fiber bundle) were measured in accordance with the methods described above. Measurement results are shown in Table 2.

For each of the carbon fiber precursor acrylic fiber bundle and the carbon fiber bundle, the long diameter/short diameter ratio of a monofilament and the recess distance/short diameter ratio of a monofilament were almost comparable to those in Example 1, but the center line average roughness Ra of the surface of a monofilament was lower as compared to Example 1. Further, the strand strength of the carbon fiber bundle was 5700 MPa, and lower as compared to Example 1.

TABLE 1

| | Physical properties of carbon fiber precursor acrylonitrile-based fiber bundle | | | Physical properties of carbon fiber bundle | | | | |
|---|---|---|---|---|---|---|---|---|
| | long diameter/short diameter ratio of monofilament | Recess distance/short diameter ratio of monofilament | Center line average roughness Ra of surface of monofilament (nm) | long diameter/short diameter ratio of monofilament | Recess distance/short diameter ratio of monofilament | Center line average roughness Ra of surface of monofilament (nm) | Strand strength (MPa) | Pressure vessel breaking pressure (MPa) |
| Example 1 | 1.23 | 0.016 | 21 | 1.23 | 0.016 | 6.8 | 5900 | 131 |
| Example 2 | 1.24 | 0.016 | 20 | 1.24 | 0.016 | 6.6 | 5950 | 133 |
| Example 3 | 1.22 | 0.016 | 23 | 1.22 | 0.016 | 7.0 | 5800 | 129 |
| Example 4 | 1.19 | 0.013 | 19 | 1.19 | 0.013 | 6.4 | 5800 | 128 |
| Reference Example 1 | 1.27 | 0.020 | 24 | 1.27 | 0.020 | 8.5 | 5700 | 126 |
| Reference Example 2 | 1.26 | 0.024 | 26 | 1.26 | 0.024 | 9.0 | 5700 | 126 |
| Comparative Example 1 | 1.23 | 0.050 | 40 | 1.23 | 0.050 | 30 | 4400 | 80 |
| Comparative Example 2 | 1.32 | 0.056 | 30 | 1.32 | 0.056 | 19 | 4400 | 80 |
| Comparative Example 3 | 1.07 | 0.009 | 17 | 1.07 | 0.009 | 5.6 | 5500 | 110 |
| Comparative Example 4 | 1.08 | 0.009 | 22 | 1.08 | 0.009 | 8.8 | 5350 | 110 |
| Comparative Example 5 | 1.05 | 0 | 11 | 1.05 | 0.000 | 3.5 | 6000 | 120 |
| Comparative Example 6 | 1.33 | 0.051 | 30 | 1.33 | 0.051 | 16 | 6000 | 123 |
| Comparative Example 7 | 1.35 | 0.075 | 33 | 1.35 | 0.075 | 18 | 6000 | 122 |
| Comparative Example 8 | 1.13 | 0.009 | 34 | 1.13 | 0.009 | 18 | 4600 | 90 |
| Comparative Example 9 | 1.05 | 0 | 15 | 1.05 | 0.000 | 5.2 | 5400 | 110 |
| Comparative Example 10 | | | | Spinning impossible | | | | |
| Example 5 | 1.23 | 0.018 | 26 | 1.23 | 0.018 | 12 | 5700 | 128 |
| Example 6 | 1.21 | 0.017 | 24 | 1.21 | 0.017 | 10 | 5750 | 128 |

TABLE 1-continued

| | Physical properties of carbon fiber precursor acrylonitrile-based fiber bundle | | | Physical properties of carbon fiber bundle | | | | |
|---|---|---|---|---|---|---|---|---|
| | long diameter/short diameter ratio of monofilament | Recess distance/short diameter ratio of monofilament | Center line average roughness Ra of surface of monofilament (nm) | long diameter/short diameter ratio of monofilament | Recess distance/short diameter ratio of monofilament | Center line average roughness Ra of surface of monofilament (nm) | Strand strength (MPa) | Pressure vessel breaking pressure (MPa) |
| Example 7 | 1.12 | 0.012 | 20 | 1.12 | 0.012 | 6.8 | 5850 | 128 |
| Example 8 | 1.16 | 0.014 | 21 | 1.16 | 0.014 | 7.9 | 5900 | 128 |
| Example 9 | 1.24 | 0.018 | 22 | 1.24 | 0.018 | 7.6 | 5900 | Not conducted |
| Example 10 | 1.20 | 0.018 | 20 | 1.20 | 0.018 | 7.4 | 5900 | 129 |
| Example 11 | 1.12 | 0.012 | 26 | 1.12 | 0.012 | 12 | 5700 | 127 |
| Comparative Example 11 | 1.29 | 0.048 | 27 | 1.29 | 0.048 | 14 | 5600 | 123 |
| Comparative Example 12 | 1.28 | 0.043 | 26 | 1.28 | 0.043 | 12 | 5700 | 124 |
| Comparative Example 13 | 1.21 | 0.018 | 30 | 1.21 | 0.018 | 18 | 4400 | 85 |
| Comparative Example 14 | 1.08 | 0.005 | 21 | 1.08 | 0.005 | 7.8 | 5400 | 115 |
| Comparative Example 15 | 1.22 | 0.016 | 14 | 1.22 | 0.016 | 4.8 | 5500 | 123 |
| Comparative Example 16 | 1.17 | 0.010 | 15 | 1.17 | 0.010 | 5.0 | 5700 | Not conducted |

TABLE 2

| | Spinning conditions | | | | | | |
|---|---|---|---|---|---|---|---|
| | Coagulation liquid | | Nozzle hole diameter (μm) | coagulated yarn take-up tensile force (mg per filament) | Draw ratio | | |
| | Concentration (%) | Temperature (° C.) | | | Draw ratio in air | Draw ratio in second coagulation liquid | Draw ratio in washing/drawing bath |
| Example 1 | 67 | 38 | 50 | 70 | 1.01 | None | 2.60 |
| Example 2 | 67 | 38 | 45 | 60 | 1.01 | None | 2.60 |
| Example 3 | 67 | 38 | 50 | 72 | 1.01 | None | 2.60 |
| Example 4 | 69 | 38 | 50 | 65 | 1.01 | None | 2.60 |
| Example 5 | 67 | 35 | 50 | 74 | 1.01 | None | 2.60 |
| Example 6 | 67 | 38 | 50 | 70 | 1.01 | None | 2.80 |
| Comparative Example 1 | 65 | 30 | 75 | 60 | None | 2.0 | 4.00 |
| Comparative Example 2 | 60 | 30 | 75 | 95 | None | 1.2 | 4.00 |
| Comparative Example 3 | 67 | 38 | 50 | 74 | 1.05 | None | 3.00 |
| Comparative Example 4 | 67 | 38 | 50 | 70 | 1.2 | None | 4.00 |
| Comparative Example 5 | 67 | 38 | 50 | 49 | 1.05 | 1.5 | 1.70 |
| Comparative Example 6 | 67 | 30 | 50 | 85 | 1.01 | None | 2.60 |
| Comparative Example 7 | 63 | 38 | 50 | 88 | 1.01 | None | 2.60 |
| Comparative Example 8 | 65 | 38 | 50 | 68 | None | None | 3.40 |
| Comparative Example 9 | 67 | 38 | 50 | 45 | 1.3 | None | 2.00 |
| Comparative Example 10 | 75 | 38 | 50 | 70 | 1.01 | None | 2.60 |
| Example 5 | 68 | 38 | 50 | 74 | 1.04 | None | 2.60 |
| Example 6 | 67 | 38 | 50 | 74 | 1.01 | None | 2.50 |
| Example 7 | 68 | 39 | 50 | 60 | 1.04 | None | 2.60 |
| Example 8 | 68 | 39 | 50 | 70 | 1.04 | None | 2.60 |
| Example 9 | 67 | 38 | 50 | 70 | 1.01 | None | 2.60 |
| Example 10 | 68 | 39 | 60 | 73 | 1.07 | None | 2.50 |
| Example 11 | 66 | 39 | 50 | 74 | 1.04 | None | 2.60 |
| Comparative Example 11 | 67 | 30 | 50 | 60 | 1.01 | None | 2.60 |
| Comparative Example 12 | 67 | 30 | 50 | 60 | 1.01 | None | 2.50 |
| Comparative Example 13 | 65 | 38 | 50 | 95 | None | None | 3.40 |
| Comparative Example 14 | 67 | 38 | 50 | 65 | 1.2 | None | 3.60 |
| Comparative Example 15 | 67 | 38 | 50 | 45 | 1.01 | None | 2.60 |
| Comparative Example 16 | 67 | 38 | 50 | 35 | 1.01 | None | 2.60 |

TABLE 2-continued

|  | Spinning conditions | | | |
|---|---|---|---|---|
|  | Draw ratio | | | |
|  | Draw ratio in hot water | Total draw ratio until drawn yarn treated in hot water bath is obtained after coagulated yarn is taken up | Draw ratio in pressurized steam atmosphere | Total draw ratio until drawing in pressurized steam atmosphere is completed after coagulated yarn is taken up |
| Example 1 | 0.98 | 2.57 | 3.50 | 9.01 |
| Example 2 | 0.98 | 2.57 | 4.20 | 10.81 |
| Example 3 | 0.98 | 2.57 | 4.20 | 10.81 |
| Example 4 | 0.98 | 2.57 | 3.50 | 9.01 |
| Example 5 | 0.98 | 2.57 | 3.50 | 9.01 |
| Example 6 | 0.98 | 2.77 | 3.50 | 9.70 |
| Comparative Example 1 | 0.98 | 7.84 | 2.00 | 15.68 |
| Comparative Example 2 | 0.98 | 4.70 | 2.00 | 9.41 |
| Comparative Example 3 | 0.98 | 3.09 | 3.50 | 10.80 |
| Comparative Example 4 | 0.98 | 4.70 | 2.60 | 12.23 |
| Comparative Example 5 | 2.00 | 5.36 | 3.50 | 18.74 |
| Comparative Example 6 | 0.98 | 2.57 | 4.20 | 10.81 |
| Comparative Example 7 | 0.98 | 2.57 | 4.20 | 10.81 |
| Comparative Example 8 | 0.98 | 3.33 | 2.00 | 6.66 |
| Comparative Example 9 | 1.00 | 2.60 | 5.00 | 13.00 |
| Comparative Example 10 | 0.98 | 2.57 | 3.50 | 9.01 |
| Example 5 | 0.98 | 2.65 | 3.50 | 9.27 |
| Example 6 | 0.98 | 2.47 | 3.80 | 9.40 |
| Example 7 | 0.98 | 2.65 | 3.40 | 9.01 |
| Example 8 | 0.98 | 2.65 | 3.40 | 9.01 |
| Example 9 | 0.98 | 2.57 | 4.20 | 10.81 |
| Example 10 | 0.98 | 2.62 | 3.50 | 9.18 |
| Example 11 | 0.98 | 2.65 | 3.40 | 9.01 |
| Comparative Example 11 | 0.98 | 2.57 | 4.20 | 10.81 |
| Comparative Example 12 | 0.98 | 2.47 | 4.20 | 10.39 |
| Comparative Example 13 | 0.98 | 3.33 | 2.00 | 6.66 |
| Comparative Example 14 | 0.98 | 4.23 | 2.60 | 11.01 |
| Comparative Example 15 | 0.98 | 2.57 | 4.20 | 10.81 |
| Comparative Example 16 | 0.98 | 2.57 | 3.50 | 9.01 |

INDUSTRIAL APPLICABILITY

From carbon fiber precursor acrylic fiber of the present invention in which a monofilament has a cross-sectional shape having a characteristic long diameter/short diameter ratio, carbon fiber having a cross-sectional shape having a similar long diameter/short diameter ratio can be obtained. A carbon fiber bundle including the carbon fiber is excellent in resin composition impregnation property, and therefore useful for preparing a CFRP tank having high strength.

REFERENCE SIGNS LIST

1: Monofilament cross-section
2: Circumscribing rectangle having the smallest area
3: Straight line contacting monofilament cross-section at two points
4: Point on circumference of region which is farthest from straight line 3
X: Long diameter
Y: Short diameter
Z: Recess distance

The invention claimed is:

1. A carbon fiber, comprising a monofilament, wherein the surface of the monofilament has a center line average roughness Ra of 6.4 nm or more and 12 nm or less, and the monofilament has a long diameter/short diameter ratio of 1.12 or more and 1.24 or less.

2. The carbon fiber according to claim 1, wherein the monofilament has a recess distance/short diameter ratio of 0.012 or more and 0.018 or less.

3. The carbon fiber according to claim 1, wherein the surface of the monofilament has a center line average roughness Ra of 10 nm or less, and the monofilament has a long diameter/short diameter ratio of 1.135 or more.

4. The carbon fiber according to claim 3, wherein the monofilament has a recess distance/short diameter ratio of 0.0145 or more.

5. A carbon fiber, comprising a monofilament, wherein the surface of monofilament has a center line average roughness Ra of 6.4 nm or more and 12 nm or less and the monofilament has a recess distance/short diameter ratio of 0.012 or more and 0.018 or less.

6. The carbon fiber according to claim 5, wherein the monofilament has a recess distance/short diameter ratio of 0.012 or more and 0.017 or less.

7. The carbon fiber according to claim 5, wherein the monofilament has a strand strength of 5700 MPa or more and 5950 MPa or less.

8. The carbon fiber according to claim 5, wherein the monofilament has a long diameter/short diameter ratio of 1.12 or more and 1.20 or less.

9. The carbon fiber according to claim 5, wherein the monofilament has a recess distance/short diameter ratio of 0.0145 or more and 0.018 or less.

10. The carbon fiber according to claim 5, wherein the monofilament has a long diameter/short diameter ratio of 1.135 or more.

11. A carbon fiber, comprising a monofilament, wherein the surface of the monofilament has a center line average roughness Ra of 6.4 nm or more and 12 nm or less, the monofilament has a long diameter/short diameter ratio of 1.12 or more and 1.24 or less, and the monofilament has a strand strength is 5700 MPa or more and 5950 MPa or less.

12. A pressure vessel, comprising a carbon fiber comprising a monofilament which is a filament wound, wherein the surface of the monofilament has a center line average roughness Ra of 6.4 nm or more and 12 nm or less, and the monofilament has a long diameter/short diameter ratio of 1.12 or more and 1.24 or less.

13. The pressure vessel according to claim 12, wherein the monofilament has a recess distance/short diameter of 0.012 or more and 0.018 or less.

14. The pressure vessel according to claim 12, having a helical layer and a hoop layer of the carbon fiber.

* * * * *